(12) United States Patent
Hsu

(10) Patent No.: US 7,924,581 B2
(45) Date of Patent: Apr. 12, 2011

(54) HIGH VOLTAGE START-UP CIRCUIT WITH CONSTANT CURRENT CONTROL

(75) Inventor: Ta-Ching Hsu, Sijhih (TW)

(73) Assignee: Niko Semiconductor Co., Ltd., Taipei (TW)

( * ) Notice: Subject to any disclaimer, the term of this patent is extended or adjusted under 35 U.S.C. 154(b) by 352 days.

(21) Appl. No.: 12/219,092

(22) Filed: Jul. 16, 2008

(65) Prior Publication Data

US 2009/0267577 A1 Oct. 29, 2009

(30) Foreign Application Priority Data

Apr. 23, 2008 (TW) ................................ 97114808 A

(51) Int. Cl.
*H02M 1/14* (2006.01)
*H02M 7/10* (2006.01)

(52) U.S. Cl. ............. 363/49; 363/50; 323/901; 323/908

(58) Field of Classification Search ..................... 363/49, 363/50; 323/901, 908
See application file for complete search history.

(56) References Cited

U.S. PATENT DOCUMENTS

| 5,548,205 A | * | 8/1996 | Monticelli | 323/274 |
| 5,815,383 A | * | 9/1998 | Lei | 363/49 |
| 6,504,352 B2 | * | 1/2003 | Halberstadt | 323/312 |

* cited by examiner

*Primary Examiner* — Bao Q Vu

(74) *Attorney, Agent, or Firm* — Rosenberg, KLein & Lee

(57) ABSTRACT

A high voltage start-up circuit with constant current control applied to a switching mode power converter is provided. The high voltage start-up circuit includes a high voltage junction transistor, a control transistor, a current detecting resistor and a bias resistor. The drain of the junction transistor is connected to a high power supply, the gate of the junction transistor is connected to the drain of the control transistor, and the source of the junction transistor is connected to the current detecting resistor. The voltage drop crossing the current detecting resistor is kept constant to have the junction transistor output a constant current. The bias resistor which is connected between the gate of the junction transistor and the output end of the high voltage start-up circuit has the gate to source bias voltage of the junction transistor kept constant to output constant current.

10 Claims, 4 Drawing Sheets

US 7,924,581 B2

HIGH VOLTAGE START-UP CIRCUIT WITH CONSTANT CURRENT CONTROL

BACKGROUND OF THE INVENTION

1. Field of the Invention

The present invention relates to a high voltage start-up circuit with constant current control, which can be applied to a switching mode power converter, suitable for high voltage power sources of wide input ranges to generate constant current output, so that the output current and time in the start-up circuit can be constant, and the start-up circuit prevents the electronic components from being damaged by excessive output current in case a short circuit occurs at the output end.

2. Description of Related Art

Referring to FIG. 1, a typical high voltage start-up circuit is shown. As illustrated in FIG. 1, the high voltage start-up circuit adapts the negative-bias gate-source voltage of a high voltage junction transistor to restrict the output current. The high voltage start-up circuit comprises a high voltage junction transistor Q1, a first Metal-Oxide Semiconductor Field-Effect Transistor (MOSFET) Q2, a second MOSFET Q3, a bias resistor R1, a PNP transistor Q4, a Zener diode ZD1 and a hysteresis comparator COMP1. The drain of the high voltage junction transistor Q1 is coupled to a high voltage power source VIN, the source of the high voltage junction transistor Q1 is coupled to the drain of the first MOSFET Q2, and the gate of the high voltage junction transistor Q1 is directly connected to the reference ground. The source of the first MOSFET Q2 is coupled to the output voltage node VOUT. When the high voltage junction transistor Q1 is turned on, the bias resistor R1 generates a positive bias voltage to turn on the first MOSFET Q2. As soon as voltage level at the output voltage node VOUT reaches a predetermined reference voltage VT, the hysteresis comparator COMP1 generates a control signal to turn on the second MOSFET Q3. Meanwhile, a negative bias voltage below a pinch-off voltage is generated between gate to source of the first. MOSFET Q2 so as to turn off the first MOSFET Q2 and stop outputting current. The Zener diode ZD1 and PNP transistor Q4 are connected in series between the reference ground and the gate of the first MOSFET Q2 to reduce the possibility of abnormal excessively-high voltage generated between the gate and the source of the first MOSFET Q2.

Referring to FIG. 2, another typical high voltage start-up circuit is shown. As illustrated in FIG. 2, the high voltage start-up circuit is similar to the high voltage start-up circuit shown in FIG. 1. The high voltage start-up circuit of FIG. 2 comprises a high voltage junction transistor Q1, a first MOSFET Q2, a second MOSFET Q3 and a bias resistor R1. Wherein the gate of the high voltage junction transistor Q1 is coupled to the gate of the first MOSFET Q2, the drain of the high voltage junction transistor Q1 is coupled to a high voltage power source VIN, the source of the high voltage junction transistor Q1 is coupled to the drain of the first MOSFET Q2, and the source of the first MOSFET Q2 is coupled to an output voltage node VOUT. When the high voltage junction transistor Q1 is turned on, the bias resistor R1 connected between the drain and gate of the first MOSFET Q2 generates a positive bias voltage to turn on the first MOSFET Q2. As soon as voltage level at the output voltage node VOUT reaches a predetermined reference voltage VT, the hysteresis comparator COMP1 generates a control signal to turn on the second MOSFET Q3. Meanwhile, a negative bias voltage is generated between gate and source of the first MOSFET Q2 so as to turn off the first MOSFET Q2 and stop outputting current as well.

FIG. 3 shows a characteristic curve depicting a relationship of the drain current ID and the gate-source voltage Vgs in the high voltage junction transistor mentioned above. In present, the high voltage start-up circuits restrict the output current by using the high voltage junction transistor. Referring to FIG. 3, the increasing of negative bias voltage between gate and source of the high voltage junction transistor leads to the reduction in drain current. However, because the typical high voltage start-up circuit lacks a current detecting resistor, the negative bias voltage between the gate and source of the high voltage junction transistor cannot be maintained and the output current ID is varied from high to low. Also referring to FIG. 4, at the instance of start-up, the high voltage start-up circuit outputs a maximum current $ID_L$ (the value of the maximum current depends on the voltage level of the high voltage power source). Then the drain current ID, which is also the output current, is reduced along a parabolic curve as time T goes on. The negative bias voltage of the high voltage junction transistor in the typical high voltage start-up circuit can be expressed as below:

$$Vgs(Q1) = -(Vth(Q2) + Vo)$$

wherein Vth(Q2) is gate to source threshold voltage of the first MOSFET Q2.

As the output voltage Vo rises, gate-source voltage Vgs (Q1) of the high voltage junction transistor Q1 is changed and the output current decreases. In order to provide sufficient output current, it is required to increase current-limiting level of the output current at the instant of start-up. However, in case a short circuit occurs at the output end, it is likely to cause excessive power consumption to burn the circuit.

SUMMARY OF THE INVENTION

Accordingly, it is an object of the present invention to provide a constant output current, which allows the output current of a start-up circuit that is constant in relation with time, and prevents electronic components from being damaged by excessive output current generated when a short circuit occurs at the output end of the start-up circuit.

The high voltage start-up circuit with constant current control according to the present invention comprises a high voltage junction transistor, a control transistor and a bias resistor. The high voltage junction transistor has a first source/drain, a second source/drain and a first gate, wherein the first source/drain is coupled to a high voltage power source and the second source/drain is coupled to an output end. The control transistor has a third source/drain, a fourth source/drain and a second gate, wherein the third source/drain is coupled to the first gate of the high voltage junction transistor, the fourth source/drain is grounded, and the second gate receives a control signal and is switched based on the received control signal. One end of the bias resistor is coupled to the first gate of the high voltage junction transistor, while the other end of the bias resistor is coupled to the output end. As the control transistor is turned off, the high voltage junction transistor outputs a constant current to the output end. As the control transistor is turned on, the high voltage junction transistor stops outputting the constant current. Thereby, a current detecting unit, such as a detecting current resistor, which has one end coupled to the second source/drain of the high voltage junction transistor and the other end coupled to the, output end, may be used to provide a constant voltage drop crossing the current detecting unit so as to maintain the negative bias voltage between gate and source of the high voltage junction transistor and have the high voltage junction transistor output constant current. In addition, the value of the output constant current may be adjusted by changing the resistance of the current detecting resistor.

The high voltage start-up circuit according to the present invention has the advantages that the constant current design can be applied in a high voltage power source with a wide input range to keep the output current and time of the start-up circuit constant, and prevent the electronic components being damaged by excessive output current in case of occurrence of any abnormal conditions at the output end, such as a short circuit. The negative bias voltage applied to the high voltage junction transistor of the high voltage start-up circuit according to the present invention can be expressed as below:

$$Vgs(Q1) = -(Io*R)$$

wherein Io represents the output current, and R is resistance of the detecting resistor.

From the formula mentioned above, since R is constant, gate-source voltage Vgs(Q1) of the high voltage junction transistor Q1 and the output current Io can be kept constant.

DETAILED DESCRIPTION OF THE PREFERRED EMBODIMENTS

Figure 5:
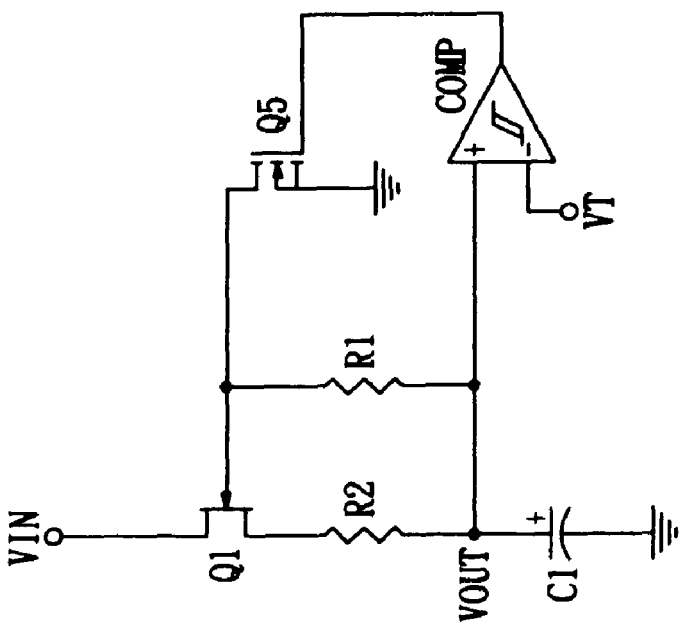
FIG. 5 is a circuit diagram showing an embodiment for the high voltage start-up circuit with constant current control according to the present invention.

FIG. 5 is a circuit diagram showing an embodiment for the high voltage start-up circuit with constant current control according to the present invention. The high voltage start-up circuit comprises a high voltage junction transistor Q1, a control transistor Q5, a current detecting unit R2, a bias resistor R1, and an energy storage capacitor C1. The high voltage junction transistor Q1 can be a Junction Field Effect Transistor (JFET) or a Depletion MOSFET. Take JFET for example. The drain of the high voltage junction transistor Q1 is coupled to the high voltage power source VIN. The source of the high voltage junction transistor Q1 is coupled to the current detecting unit R2, such as a current detecting resistor. The voltage drop generated by the current of the high voltage junction transistor Q1 flowing through the detecting unit R2 causes the bias voltage applied to the high voltage junction transistor Q1 to have the high voltage junction transistor Q1 output current.

In practice, the source of the high voltage junction transistor Q1 may be directly coupled to the output end VOUT of the high voltage start-up circuit to achieve the object of constant current output. However, the additional current detecting unit R2 coupled between the source of the high voltage junction transistor Q1 and the output end VOUT of the high voltage start-up circuit may be used to adjust the value of the output constant current of the high voltage start-up circuit by changing the resistance thereof. One end of the bias resistor R1 is coupled to the gate of the high voltage junction transistor Q1, and the other end of the bias resistor R1 is coupled to the output end VOUT of the high voltage start-up circuit so as to have the gate voltage of the high voltage junction transistor Q1 identical to the output voltage of the high voltage start-up circuit. The output end VOUT is coupled to a control circuit or a load (not shown) for providing electric power. Through the feedback formed by the current detecting unit R2 and the bias resistor R1, the bias gate-source voltage of the high voltage junction transistor Q1 can be maintained to provide constant output current.

In addition, by using a control unit, such as the hysteresis comparator COMP in the present embodiment, when the output voltage reaches a predetermined reference voltage VT, the control unit may generate a control signal to turn on the control transistor Q5 to have the gate-source negative bias voltage of the high voltage junction transistor Q1 lower than a pinch off voltage to turn off the high voltage junction transistor Q1 and stop current output as well.

Figure 2:
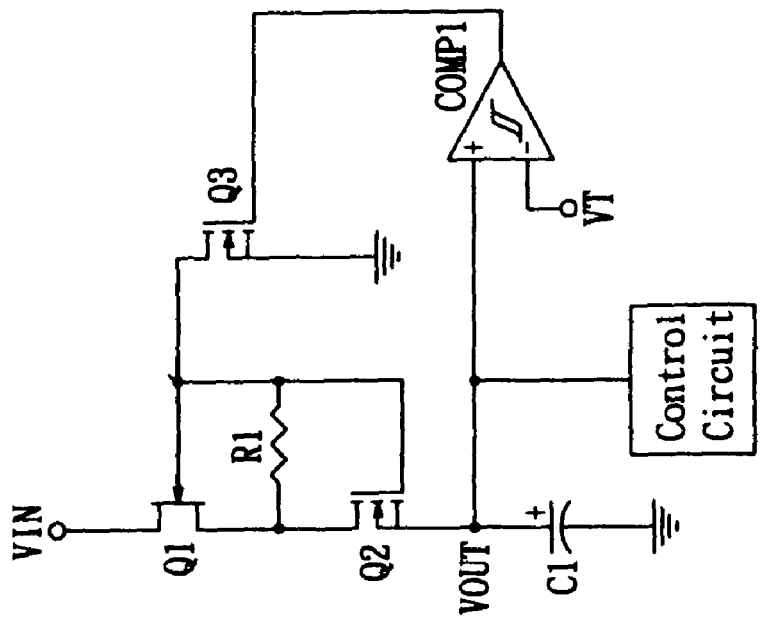
FIG. 2 is a circuit diagram showing another typical high voltage start-up circuit.
Figure 1:
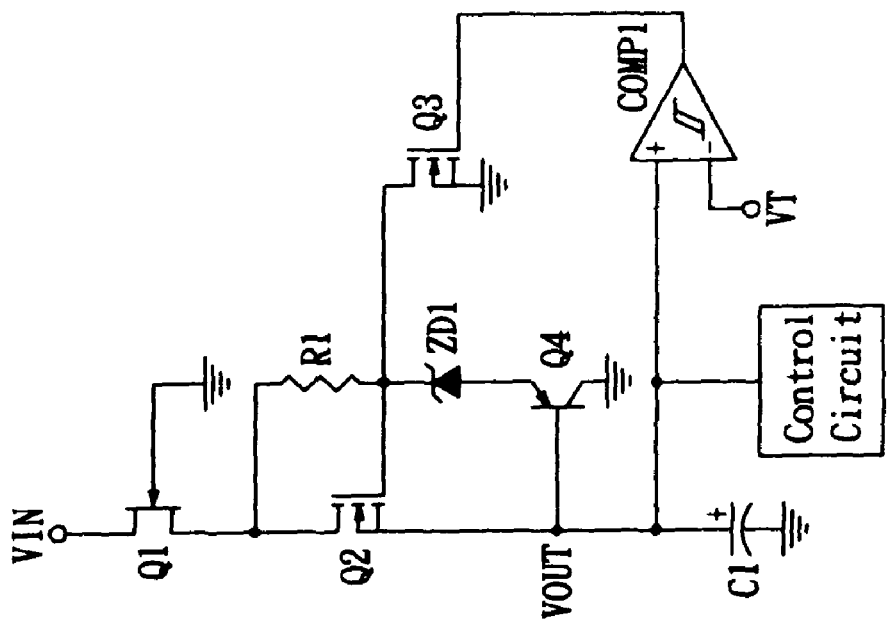
FIG. 1 is a circuit diagram showing a typical high voltage start-up circuit.
Figure 3:
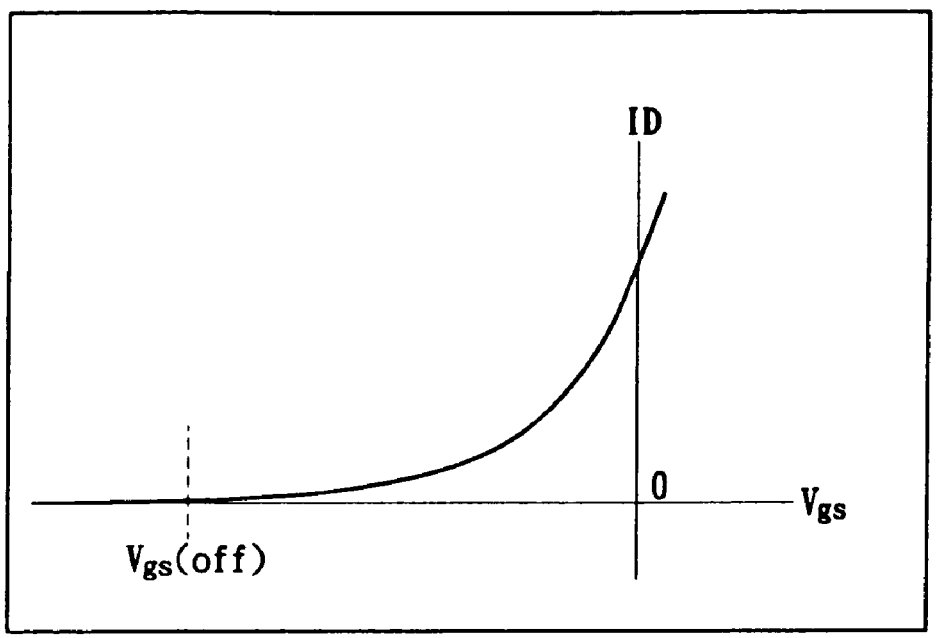
FIG. 3 is a diagram showing a characteristic curve depicting drain current vs. gate-source voltage in the high voltage junction transistor of the typical high voltage start-up circuit.
Figure 4:
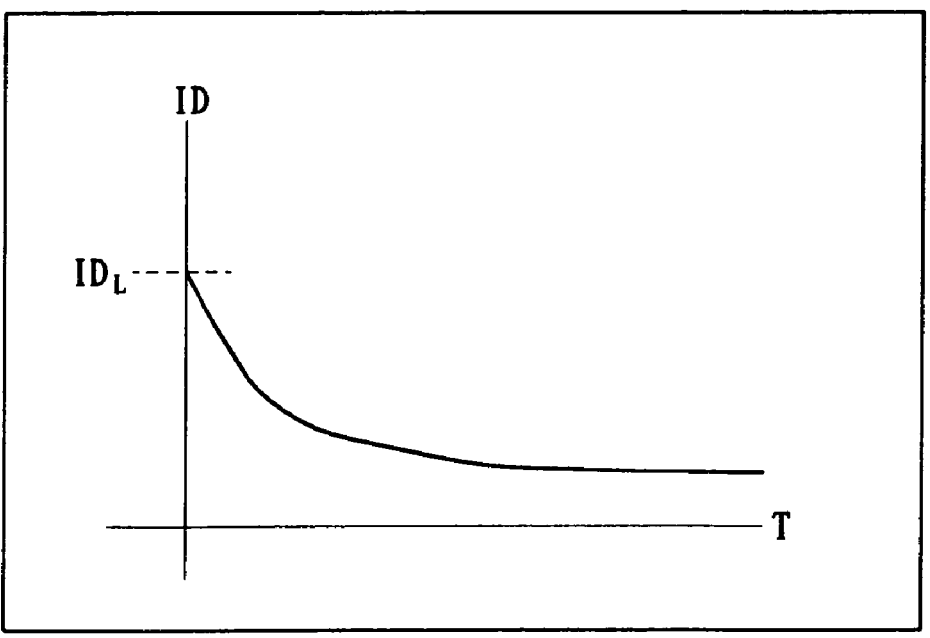
FIG. 4 is a diagram showing a relationship of the output, current vs. time of the typical high voltage start-up circuit.
Figure 6:
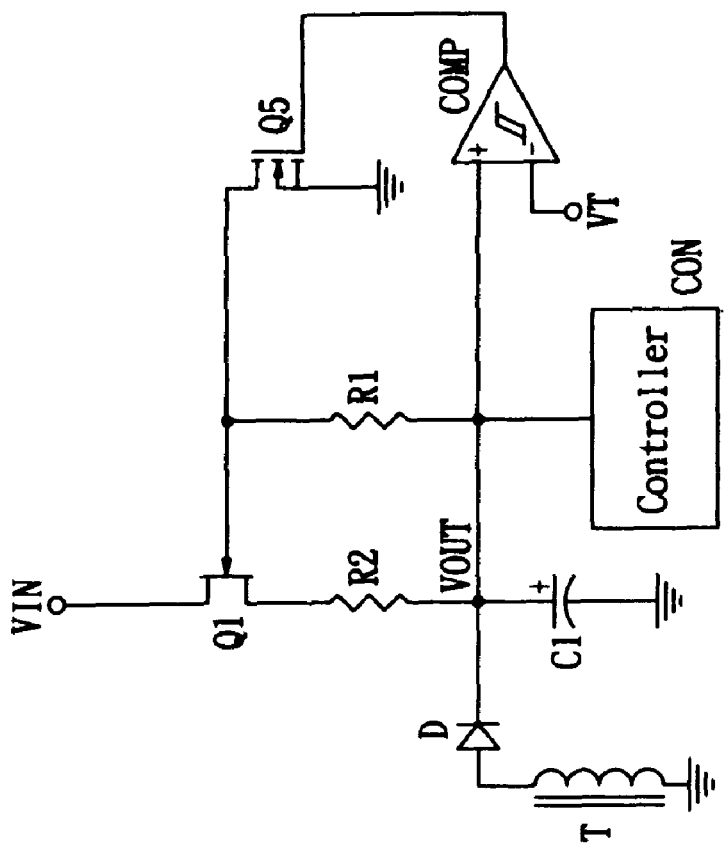
FIG. 6 is a circuit diagram showing another embodiment for the high voltage start-up circuit with constant current control according to the present invention.

As illustrated in FIG. 6, a circuit diagram of another embodiment for the high voltage start-up circuit with constant current control according to the present invention is shown. In the present embodiment, the output end VOUT is coupled to a controller CON for providing electric power to the controller CON. Additionally, the output end VOUT is coupled to a winding T of a transformer through a rectifying diode D. When the controller CON is started-up and the high voltage junction transistor Q1 is turned off, the winding T can provide electric power to the controller CON via the rectifying diode D to have the controller CON work continuously.

Figure 7:
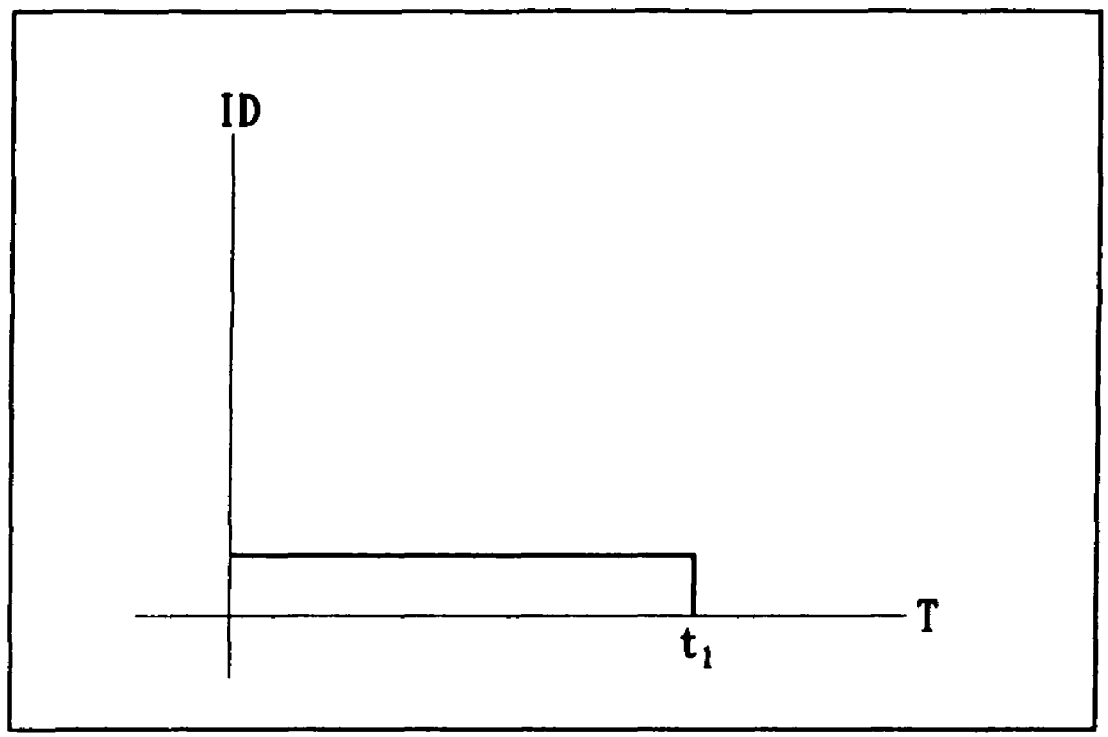
FIG. 7 is a diagram showing a relationship of the output current vs. time of the high voltage start-up circuit with constant current control according to the present invention.

Finally, refer to FIG. 7, a diagram showing a relationship of the output current vs. time of the high voltage start-up circuit with constant current control according to the present invention. In contrast with FIGS. 5 and 6, as illustrated in FIG. 7, after start-up, the output current is kept constant until time $T_1$, where the output voltage VOUT reaches the reference voltage VT, the high voltage junction transistor Q1 is turned off, and the output current reduces to zero accordingly. Therefore, the high voltage start-up circuit with constant control current according to the present invention can prevent electronic components from being damaged by excessive output current when a short circuit occurs at the output end.

In summary, the present invention completely matches the three requirements for patent applications: innovation, advancement and industrial usability. The present invention has been disclosed by means of preferred embodiments thereof; but those skilled in the art should appreciate that the descriptions of the embodiments are used to illustrate the present invention, instead of being construed as limitation of the present invention. It should be noted that all modifications and alternations equivalent effectively in the above-described embodiments should be deemed to be encompassed by the scope of the present invention, Hence, the scope to be protected by patent-related laws and regulations should be delineated by the subsequent claims.

What is claimed is:

1. A high voltage start-up circuit with constant current control, comprising:
   a high voltage junction transistor, having a first source/drain, a second source/drain, and a first gate, wherein the first source/drain is coupled to a high voltage power source, and the second source/drain is coupled to an output end of the high voltage start-up circuit;

a control transistor, having a third source/drain, a fourth source/drain, and a second gate, wherein the third source/drain is coupled to the first gate of the high voltage junction transistor, the fourth source/drain is grounded, and the second gate receives a control signal and is switched based on the received control signal; and a bias resistor, having one end coupled to the first gate of the high voltage junction transistor and the other end coupled to the output end of the high voltage start-up circuit;

wherein, as the control transistor is turned off, the high voltage junction transistor outputs a constant current to the output end of the high voltage start-up circuit, and as the control transistor is turned on, the high voltage junction transistor stops outputting the constant current.

2. The high voltage start-up circuit with constant current control according to claim 1, further comprising a current detecting unit, having one end coupled to the second source/drain of the high voltage junction transistor and the other end coupled to the output end of the high voltage start-up circuit.

3. The high voltage start-up circuit with constant current control according to claim 2, further comprising an energy storage capacitor coupled to the output end of the high voltage start-up circuit for receiving the constant current and generating an output voltage.

4. The high voltage start-up circuit with constant current control according to claim 3, wherein the output end of the high voltage start-up circuit is coupled to a control circuit or a load.

5. The high voltage start-up circuit with constant current control according to claim 3, further comprising a control unit, utilized for providing the control signal to turn off the control transistor when a voltage level at the output end of the high voltage start-up circuit reaches a predetermined level.

6. The high voltage start-up circuit with constant current control according to claim 5, wherein the control unit has a hysteresis comparator, and the hysteresis comparator has one input end coupled to the output end of the high voltage start-up circuit, another input end applied with a reference voltage, and an output end utilized for outputting the control signal.

7. The high voltage start-up circuit with constant current control according to claim 6, wherein the output end of the high voltage start-up circuit is coupled to a control circuit or a load.

8. The high voltage start-up circuit with constant current control according to claim 3, further comprising a diode, having one end thereof coupled to the output end of the high voltage start-up circuit and a controller, and another end coupled to a winding of a transformer.

9. The high voltage start-up circuit with constant current control according to claim 8, further comprising a control unit, utilized for providing the control signal to turn off the control transistor when a voltage level at the output end of the high voltage start-up circuit reaches a predetermined level.

10. The high voltage start-up circuit with constant current control according to claim 9, wherein the control unit comprises a hysteresis comparator, and the hysteresis comparator has one input end coupled to the output end of the high voltage start-up circuit, another input end applied with a reference voltage, and an output end utilized for outputting the control signal.

* * * * *